(12) United States Patent
Loboz et al.

(10) Patent No.: US 8,122,117 B2
(45) Date of Patent: Feb. 21, 2012

(54) DETERMINING AN IMBALANCE AMONG COMPUTER-COMPONENT USAGE

(75) Inventors: Charles Z. Loboz, Redmond, WA (US);
Hongzhong Jia, Mountain View, CA (US); Slawek Smyl, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 357 days.

(21) Appl. No.: 12/473,534

(22) Filed: May 28, 2009

(65) Prior Publication Data

US 2010/0306781 A1 Dec. 2, 2010

(51) Int. Cl.
*G06F 15/173* (2006.01)
(52) U.S. Cl. ........................ 709/223; 709/224
(58) Field of Classification Search .................. 709/223, 709/224
See application file for complete search history.

(56) References Cited

U.S. PATENT DOCUMENTS

| | | | |
|---|---|---|---|
| 6,237,063 B1 | 5/2001 | Bachmat | |
| 6,405,284 B1 | 6/2002 | Bridge | |
| 6,601,084 B1 * | 7/2003 | Bhaskaran et al. | 718/105 |
| 6,711,649 B1 | 3/2004 | Bachmat | |
| 6,970,973 B2 | 11/2005 | Katsuragi | |
| 7,305,471 B2 * | 12/2007 | Odhner et al. | 709/226 |
| 7,418,470 B2 * | 8/2008 | Howard et al. | 709/201 |
| 7,836,314 B2 * | 11/2010 | Chieu et al. | 713/300 |
| 2005/0044228 A1 * | 2/2005 | Birkestrand et al. | 709/226 |
| 2006/0221086 A1 * | 10/2006 | Diard | 345/505 |
| 2007/0233449 A1 | 10/2007 | Peterson | |
| 2009/0109230 A1 * | 4/2009 | Miller et al. | 345/506 |

OTHER PUBLICATIONS

Disk Subsystem Load Balancing: Disk Striping vs. Conventional Data Placement http://ieeexplore.ieee.org/stamp/stamp.jsp?arnumber=270759&isnumber=6718 1993.
A Novel Load Balancing Algorithm for I/O-Intensive Load in Heterogeneous Clusters http://dspace.nitrkl.ac.in:8080/dspace/bitstream/2080/622/1/ICAC2008.pdf Feb. 21-22, 2008.
Tunable Randomization for Load Management in Shared-Disk Clusters http://ssrc.cse.ucsc.edu/PaperArchive/wu-tos04.pdf Dec. 2004.
Adaptive Load Balancing in Disk Arrays http://citeseerx.ist.psu.edu/viewdoc/download?doi=10.1.1.17.7095&rep=rep1&type=pdf.
HP Capacity Advisor Version 4.0 User's Guide http://www.docs.hp.com/en/T8670-90001/T8670-90001.pdf May 2008.

* cited by examiner

*Primary Examiner* — Minh-Chau Nguyen
(74) *Attorney, Agent, or Firm* — Shook Hardy & Bacon LLP (57) ABSTRACT

The present invention is directed to determining an imbalance among computer-component usage. Based on a performance value (e.g. utilization value, response time, queuing delay, Input/Output operations, bytes transferred, work threads used, connections made, etc) that describes a respective computer component among a set of computer components, and an average performance value of the set, a component value of each computer component in the set can be determined. Each component value quantifies a contribution of the usage of a respective computer component toward an imbalanced assignment of computer operations. Component values are information rich and comparisons of component values suggest levels of over-utilization and under-utilization of the computer components. Based on the component values of a set of computer components, decisions can be made as to what portion of computer operations should be reassigned to enable computer operations to be executed in a more balanced manner by the set of computer components.

11 Claims, 6 Drawing Sheets

DETERMINING AN IMBALANCE AMONG COMPUTER-COMPONENT USAGE

BACKGROUND

Computer operations are often carried out by a group of computer components. However, an imbalanced assignment of computer operations among the various computer components of the group can lead to a suboptimal efficiency. As such, identifying an imbalance and measuring an extent to which computer operations are unevenly assigned is helpful in suggesting how the computer operations should be re-assigned.

SUMMARY

Embodiments of the invention are defined by the claims below, not this summary. A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

One embodiment of the present invention is directed to a method of re-assigning computer operations between a set of computer components. Based in-part on a performance value (e.g., utilization value, Input/Output (I/O) Operations, bytes transferred, etc.) of a computer component, a component value is determined. The component value quantifies a contribution of the usage of the computer component toward an imbalanced assignment of the computer operations. Based on the component value, a portion of the computer operations being executed by the computer component are reassigned to one or more other computer components of the set of computer components.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Figure 2:
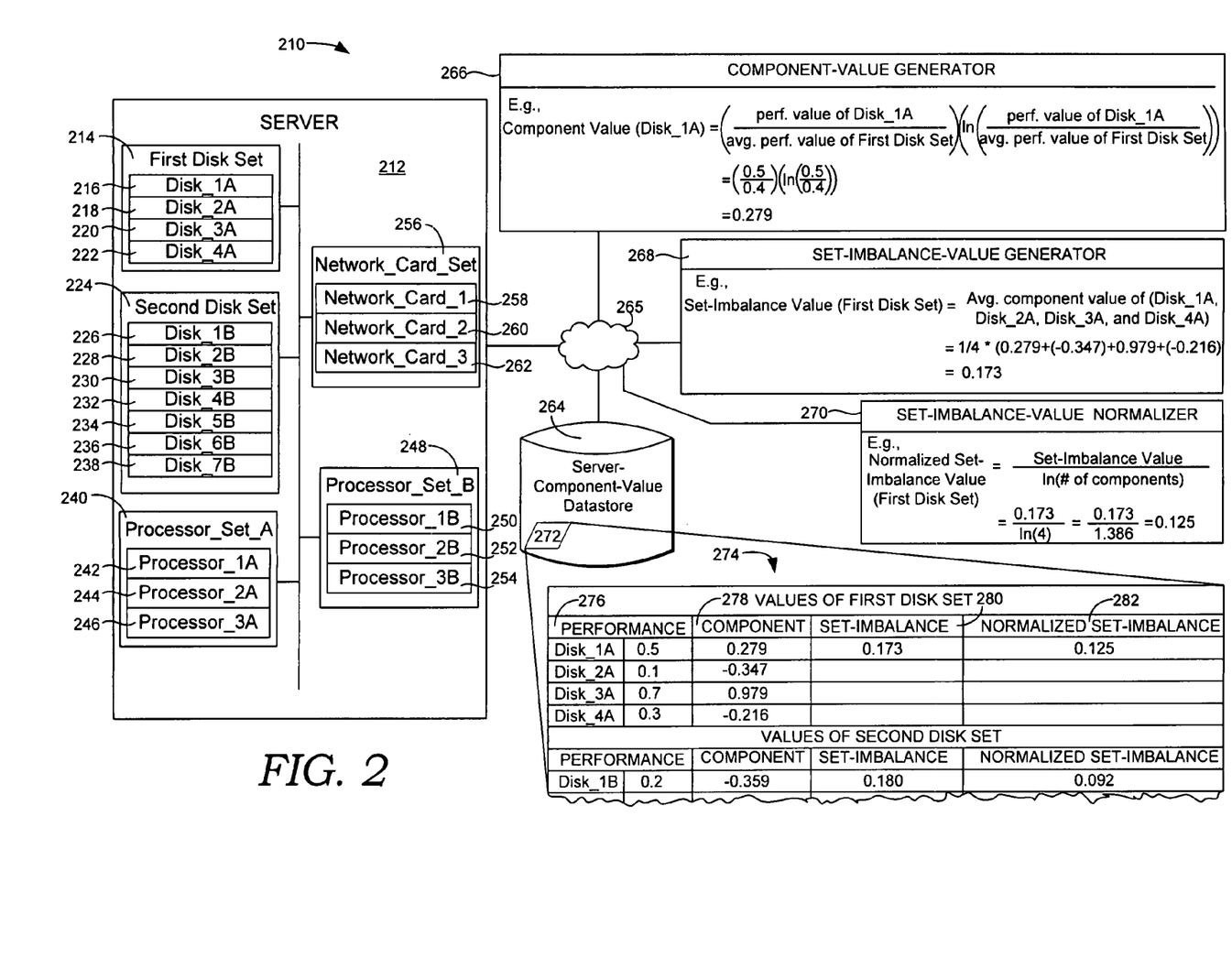
FIG. 2 depicts a schematic diagram of an illustrative operating environment suitable for reassigning computer operations, in accordance with an embodiment of the present invention.

Embodiments of the present invention are directed to quantifying an imbalance in a usage of computer components toward executing computer operations. In embodiments of the present invention, an "imbalance" refers to a computer component of a set of computer components being used more or less than another computer component of the set to execute computer operations. Examples of computer components include a server, a router, a switch, and a network link, each of which are usable to perform various types of computer operations. Computer components also include components within a server, such as a server disk (or simply "disk"), a processor, and a network card. Moreover, computer components might be arranged in sets of computer components, such as sets of disks, sets of processors, and sets of network cards. Referring briefly to FIG. 2, an exemplary server is depicted and indentified generally by reference numeral 212. Server 212 includes various groups of computer components, i.e., disks, processors, and network cards. In embodiments of the present invention, quantifying an imbalance of a usage of computer components, e.g., a set of disks, is usable to suggest how computer operations might be reassigned among the computer components to enable computer operations to be executed more efficiently.

Embodiments of the present invention include a computing device. As such, referring now to FIG. 1, a general computing device is depicted and designated generally as computing device 100. Computing device 100 is but one example of a suitable computing environment and is not intended to suggest any limitation as to the scope of use or functionality of invention embodiments. Neither should the computing-environment 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network.

Figure 1:
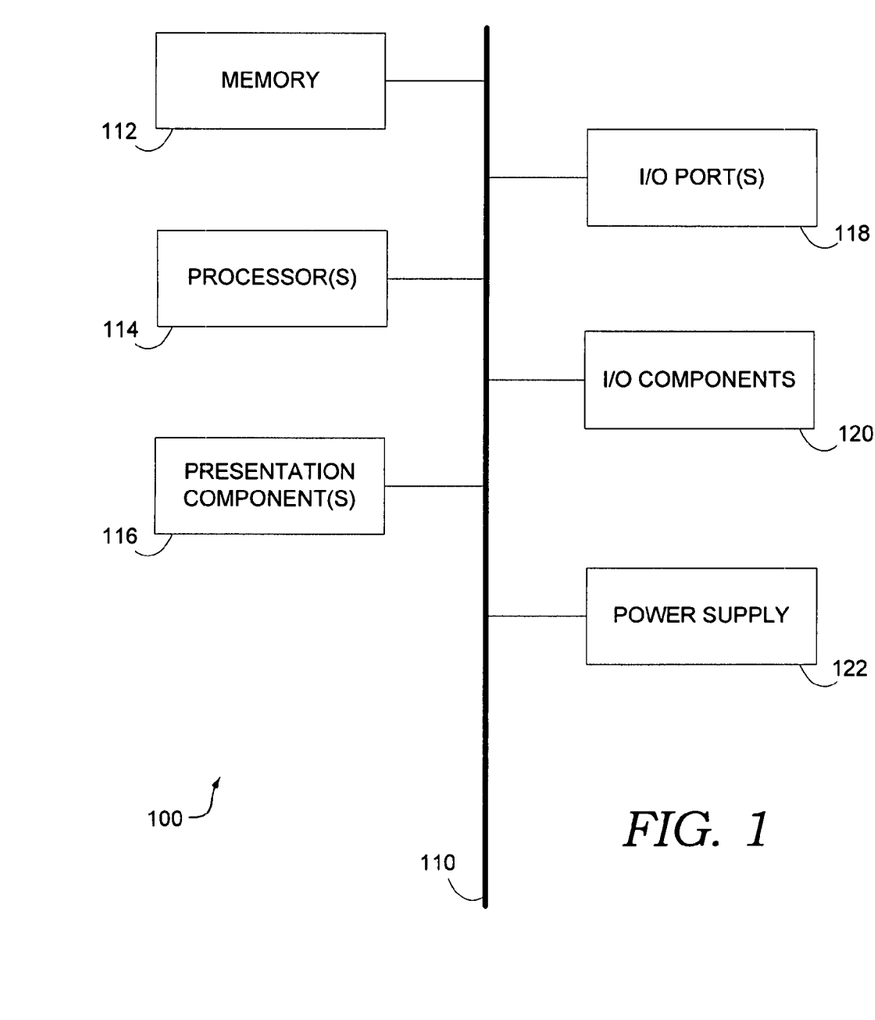
FIG. 1 depicts a block diagram illustrating certain components of an illustrative computing device suitable for practicing an embodiment of the present invention.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Returning to FIG. 2, an illustrative operating environment 210 is depicted that is suitable for quantifying an imbalance in a usage of computer components. FIG. 2 includes an exemplary server 212, which includes various sets of server components. For example, server 212 includes First Disk Set 214, which includes Disk_1A 216, Disk_2A 218, Disk_3A 220, and Disk_4A 222. Server 212 also includes Second Disk Set 224, Processor_Set_A 240, Processor_Set_B 248, and Network_Card_Set 256, each of which includes a respective set of components that are also depicted in FIG. 2. Accordingly, one exemplary embodiment includes determining that computer operations being executed by a set of server components are not evenly assigned among the computer components of the set. For example, an imbalance might be quantified that describes that computer operations being executed by First Disk Set 214 are unevenly assigned among Disk_1A 216, Disk_2A 218, Disk_3A 220, and Disk_4A 222. Another exemplary embodiment includes determining that one set of computer components is more imbalanced than another set of computer components. For example, a determination might be made that First Disk Set 214 is more imbalanced than Second Disk Set 224, or that Processor_Set_A 240 is more imbalanced than Processor_Set_B 248. Quantifying an imbalance suggests how computer operations might be reassigned (e.g., receiving input from a user that moves files, rearranges applications, etc.) to enable the computer operations to be executed more efficiently.

In exemplary embodiments of the present invention, various elements that are depicted in FIG. 2 are usable to quantify an imbalance of usage of computer components. Generally, server 212 is shown in communication via network 265 with a server-component-value datastore 264, a component-value generator 266, a set-imbalance-value generator 268, and a set-imbalance-value normalizer 270.

In exemplary embodiments of the present invention, server-component-value datastore 264 stores values that describe server components (e.g., Disk_1A 216) and sets of server components (e.g., First Disk Set 214). Server-component-value datastore 264 includes data 272, which for illustrative purposes is shown in an expanded view 274. Expanded view 274 illustrates types of information (e.g., performance values, component values, set-imbalance values, and normalized set-imbalance values) that might be stored with respect to First Disk Set 214 and Second Disk Set 224. However, expanded view 274 is truncated, and in embodiments of the present invention, data 272 includes data that describes each of the other server components (e.g., Processor_Set_A 240, Processor_Set_B 248, and Network_Card_Set 256).

In embodiments of the present invention server-component-value datastore 264 stores performance values that indicate a usage of a computer component toward executing computer operations. As such, expanded view 272 includes a performance-value column 276. Examples of performance values include a utilization value, which describes a percentage of time during which the first computer component is in use; an operation time that indicates an average duration of time required by the first computer component to process an operation; an average queuing delay; a combination of the operation time and the average queuing delay; a number of input and output operations executed; a number of bytes transferred in a given time period; a number of work threads used to process an operation; and a number of connections made for an operation. Performance-value column 276 of expanded view 274 includes performance values that describe each of Disk_1A, Disk_2A, Disk_3A, Disk_4A, and Disk_1B, all of which correspond to server components in server 212.

In embodiments of the present invention, performance values (which indicate a usage of computer components toward executing computer operations) are utilized to quantify an extent to which computer operations are unevenly assigned among a set of computer components. More specifically, by comparing a performance value of one computer component, which belongs to a set of computer components, to an average performance value of the set of computer components, a component value can be generated that quantifies a contribution of the usage of the computer component toward an imbalanced assignment of computer operations between the set of computer components. In one embodiment, in order to calculate a component value of a computer component, an algorithm is applied both to a performance value of the computer component and to an average performance value of the set of computer components to which the computer component belongs. One such component-value algorithm includes the following:

$$\text{Component Value} = (y_i/y_{avg}) * \ln(y_i/y_{avg}),$$

in which $y_i$ is the performance value of the computer component and $y_{avg}$ is the mean value of the performance values among the set of computer components. However, in other exemplary embodiments, alternative algorithms might also be used in which the component value is sensitive to levels of performance values. Such algorithms are information rich in that they point out the over-utilization or under-utilization (and by how much) of a component, as opposed to the average utilization of all the components. They are distinguishable from calculations that do not depend on the levels of performance values. For example, standard deviation does not depend on levels and instead only depends on differences.

In one embodiment, values that are stored in server-component-value datastore 264 are referenced by component-value generator 266 and are used to determine component values. Moreover, once a component value is determined, the component value is stored in server-component-value datastore 264. For example, FIG. 2 depicts an application of the component-value algorithm to performance values of the computer components of First Disk Set (i.e., 0.5, 0.1, 0.7, and 0.3), in order to calculate a component value that describes Disk_1A. FIG. 2 illustrates that component-value generator 266 calculates a component value of 0.297 to describe Disk_1A and that 0.297 is stored in data 272 under the component-value column 278.

In further embodiments of the present invention, once a component value has been determined to describe each computer component among a set of computer components, a set-imbalance value can be determined that quantifies an extent to which computer operations are unevenly assigned between computer components of the set. In one embodiment a set-imbalance value is equal to an average component value of all computer components among the set. For example, an algorithm that is usable to calculate a set-imbalance value and that incorporates the previously described component-value algorithm, might include the following:

$$\text{Set-Imbalance Value} = 1/n * \Sigma_{i=1}^{n}(y_i/y_{avg})*\ln(y_i/y_{avg}),$$

in which n is the number of components in the set of computer components and the sum is computed over the whole set of computer components. As previously described, $y_i$ is the measure of some performance value of computer component and $y_{avg}$ is the mean value of that performance value among the set of computer components.

In one embodiment, values that are stored in server-component-value datastore 264 are referenced by set-imbalance-value generator 268 and are used to determine set-imbalance values. Moreover, once a set-imbalance value is determined, it is stored in server-component-value datastore 264. For example, as listed under component-value column 278, FIG. 2 depicts that component values, which include 0.279, −0.347, 0.979, and −0.216, have been determined for each of Disk_1A, Disk_2A, Disk_3A, and Disk_4A. Accordingly, those values might be referenced by set-imbalance-value generator 268 to determine a set-imbalance value of First Disk Set. By applying the set-imbalance-value algorithm, set-imbalance-value generator 268 calculates a set-imbalance value of 0.173 to describe First Disk Set, and the set-imbalance value of 0.173 is stored in server-component-value datastore 264 under set-imbalance-value column 280.

As depicted in FIG. 2, both component-value generator 266 and set-imbalance-value generator 268 are used to apply an algorithm to a set of values. Component-value generator 266 is shown separate from set-imbalance-value generator 268 for illustrative purposes; however, both generators 266 and 268 might also be combined, e.g., component-value generator 266 might comprise a part of set-imbalance-value generator 268. Moreover, the component-value algorithm and set-imbalance-value algorithm are described as separate algorithms for explanatory purposes; however, in some embodiments of the present invention, component values are determined in the course of calculating a set-imbalance value.

In embodiments of the present invention, a set-imbalance value is usable to quantify an extent to which a set of computer components are imbalanced. For example, computer components that are within a set and that are being used equally to execute computer operations (based on performance values) will generate a set-imbalance value of zero (all performance values are equal). On the other hand, a maximum set-imbalance-value, which describes a maximum extent to which computer components are imbalanced, is equal to ln(n), where n denotes the number of computer components in the set. Accordingly, by considering where the set-imbalance value falls within a range from zero to ln(n), the set-imbalance value is usable to measure an extent to which a set of computer components is imbalanced.

In further embodiments, each component value that is used to calculate a set-imbalance value is usable to quantify an extent to which a respective computer component contributes to the imbalance, i.e., the set-imbalance value. For example, in expanded view 274, First Disk Set has a set-imbalance value of 0.173, which is usable to evaluate an imbalance between 0 and 1.386 (between the minimum set imbalance value, which is zero, and the maximum set-imbalance value, which is ln(4)). The component values, including 0.279, −0.347, 0.979, and −0.216, are usable to quantify an extent to which individual computer components are contributing to the imbalanced assignment of computer operations, i.e., contributing to the set-imbalance value of 0.173.

In another embodiment of the present invention, a comparison of component values among a set of computer components is usable to suggest how computer operations should be reassigned. For example, FIG. 2 depicts that both Disk_1A and Disk_3A have a respective component value that is higher than the set-imbalance value; however, a comparison of those respective component values (i.e., 0.279 and 0.979) suggests that reducing the load on Disk_3A would be approximately three times more effective (i.e., 0.979/0.279) in balancing the components than reducing the load of Disk_1A by a same quantity.

In further embodiments, a comparison of set-imbalance values, each of which describes the same set of computer components, is usable to suggest a nature of an imbalance. For example, a first set-imbalance value might be determined based on performance values that describe a utilization value, i.e., percentage of time during which a computer component is in use. A second set-imbalance value might also be determined based on performance values that describe a response time. A comparison of the first set-imbalance value to the second set-imbalance value is usable to analyze an imbalance from different perspectives. For example, a set-imbalance value based on utilization values might not suggest an imbalance, or might only suggest a small imbalance; however, a large inequality might exist based on response times, thereby suggesting that computer operations should be reassigned. By calculating set-imbalance values using different performance values, imbalances that might otherwise not be detected can be identified and measured.

Figure 3:
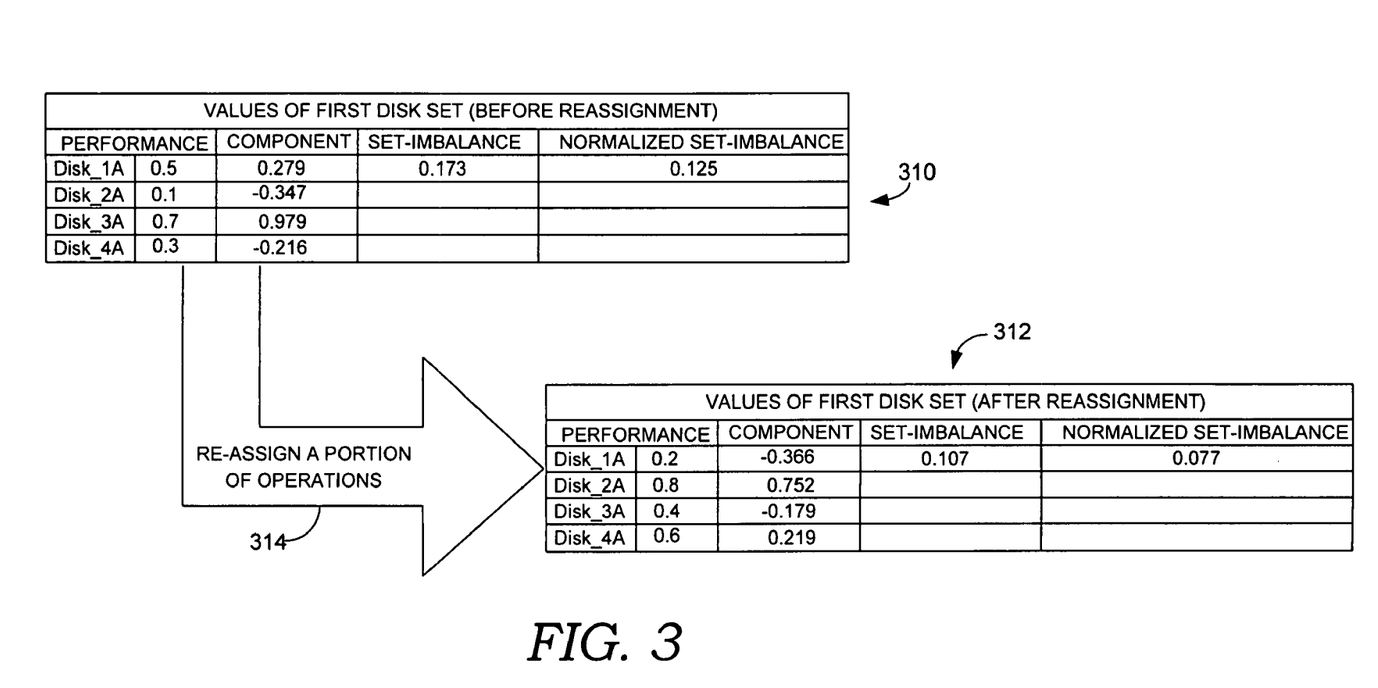
FIG. 3 depicts a transition in server-component values in accordance with an embodiment of the present invention.

In another embodiment, a second set-imbalance value, which has been calculated after computer operations have been reassigned, is usable to determine if computer operations are more evenly assigned as a result of the reassignment. Referring to FIG. 3, exemplary values are depicted, which might be stored in server-component-value datastore 264. For example, exemplary data 310, which describes First Disk Set, is the same data that is shown in expanded view 274 (in FIG. 2) and depicts values before computer operations have been reassigned. As previously described, based on a set-imbalance value of 0.173 and component values of 0.279, −0.347, 0.979, and −0.216, computer operations that are being executed by Disk_1A, Disk_2A, Disk_3A, and Disk_4A might be reassigned. A reassignment of computer operations is depicted by step 314. Accordingly, exemplary data 312 depicts values after a reassignment has occurred. Exemplary data 312 includes a set-imbalance value of 0.107 and is usable, by comparison to exemplary data 310, to determine that computer operations being performed by First Disk Set are more evenly assigned to Disk_1A, Disk_2A, Disk_3A, and Disk_4A, i.e., the set-imbalance value of First Disk Set before reassignment is greater than the set-imbalance value of First Disk Set after reassignment.

In further embodiments of the present technology, an imbalance of a first set of computer components is compared to an imbalance of a second set of computer components in order to suggest which set of computer components is more imbalanced. Such a comparison is usable to determine which set of computer components (between the first set and the second set) should have computer operations reassigned first. For example, in accordance with previously described embodiments, set-imbalance values of both Processor_Set_A and Processor_Set_B can be determined. The set-imbalance value of Processor_Set_A can be compared to the set-imbalance value of Processor_Set_B to determine which set of computer components is more imbalanced. As between Processor_Set_A and Processor_Set_B, the computer operations of the set of components that is more imbalanced (i.e., has the higher set-imbalance value) are reassigned first.

In another embodiment of the present invention, imbalances of two different sets of computer components, which have different numbers of individual computer components, are compared in order to determine which set of computer components is more imbalanced. For example, an imbalance of First Disk Set, which has four disks, might be compared to an imbalance of Second Disk Set, which has seven disks. In order to compare sets having different numbers of computer components, a normalized set-imbalance value is determined. In one embodiment a normalized set-imbalance value is equal to a set-imbalance value divided by ln(n). For example, an algorithm that is usable to calculate a set-imbalance value (and that incorporates the previously described algorithms) might include the following:

Normalized Set-Imbalance Value=$[1/n * \Sigma_{i=1}^{n}(y_i/y_{avg}) * \ln(y_i/y_{avg})]/(\ln(n))$, in which, as previously described, $y_i$ is the measure of some performance value of a computer component, $y_{avg}$ is the mean value of that performance value among the set of computer components, n is the number of components in the set of computer components, and the sum is computed over the whole set of computer components. Based on the normalized set-imbalance value algorithm, in embodiments of the present invention normalized set-imbalance values range from zero to one.

In one embodiment, values that are stored in server-component-value datastore 264 are referenced by set-imbalance-value normalizer 270 and used to determine a normalized set-imbalance value. Moreover, once a normalized set-imbalance value is determined, it is stored in server-component-value datastore 264. For example, as listed under set-imbalance column 280, FIG. 2 depicts that a set-imbalance value (i.e., 0.173) has been determined for First Disk Set. Accordingly, that set-imbalance value might be referenced by set-imbalance-value normalizer 270 to determine a normalized set-imbalance value of First Disk Set. By applying the normalized set-imbalance-value algorithm, set-imbalance-value normalizer 270 calculates a normalized set-imbalance value of 0.125 to describe First Disk Set, and the normalized set-imbalance value of 0.125 is stored in server-component-value datastore 264 under normalized set-imbalance-value column 282.

In embodiments of the present invention, after normalized set-imbalance values have been determined, sets of computer components having unequal numbers of computer components can be compared to determine which set is more imbalanced. For example, FIG. 2 depicts that for First Disk Set, a normalized set-imbalance value of 0.125 has been calculated, and that for Second Disk Set, a normalized set-imbalance value of 0.092 has been calculated. As such, a comparison of the First Disk Set normalized set-imbalance value to the Second Disk Set normalized set-imbalance value suggests that First Disk Set is more imbalanced than Second Disk Set. The example depicted by FIG. 2 suggests that First Disk Set was more imbalanced than Second Disk Set, even though the First Disk Set set-imbalance value of 0.173 is less than the Second Disk Set set-imbalance value of 0.180. Accordingly, FIG. 2 illustrates how set-imbalance-value normalizer 270 takes into account the fact that imbalances of each of First Disk Set and Second Disk Set are actually spread out over a respective number of computer components.

Embodiments described with respect to FIG. 2 included sets of computer components having relatively small numbers of computer components, e.g., four disks, seven disks, three processors, and three network cards. However, embodiments of the present invention also include application of the previously described algorithms to performance values of sets of computer components, which might include any number of computer components (e.g. tens, hundreds, thousands, tens-of-thousands, hundreds-of-thousands, etc.).

Figure 4:
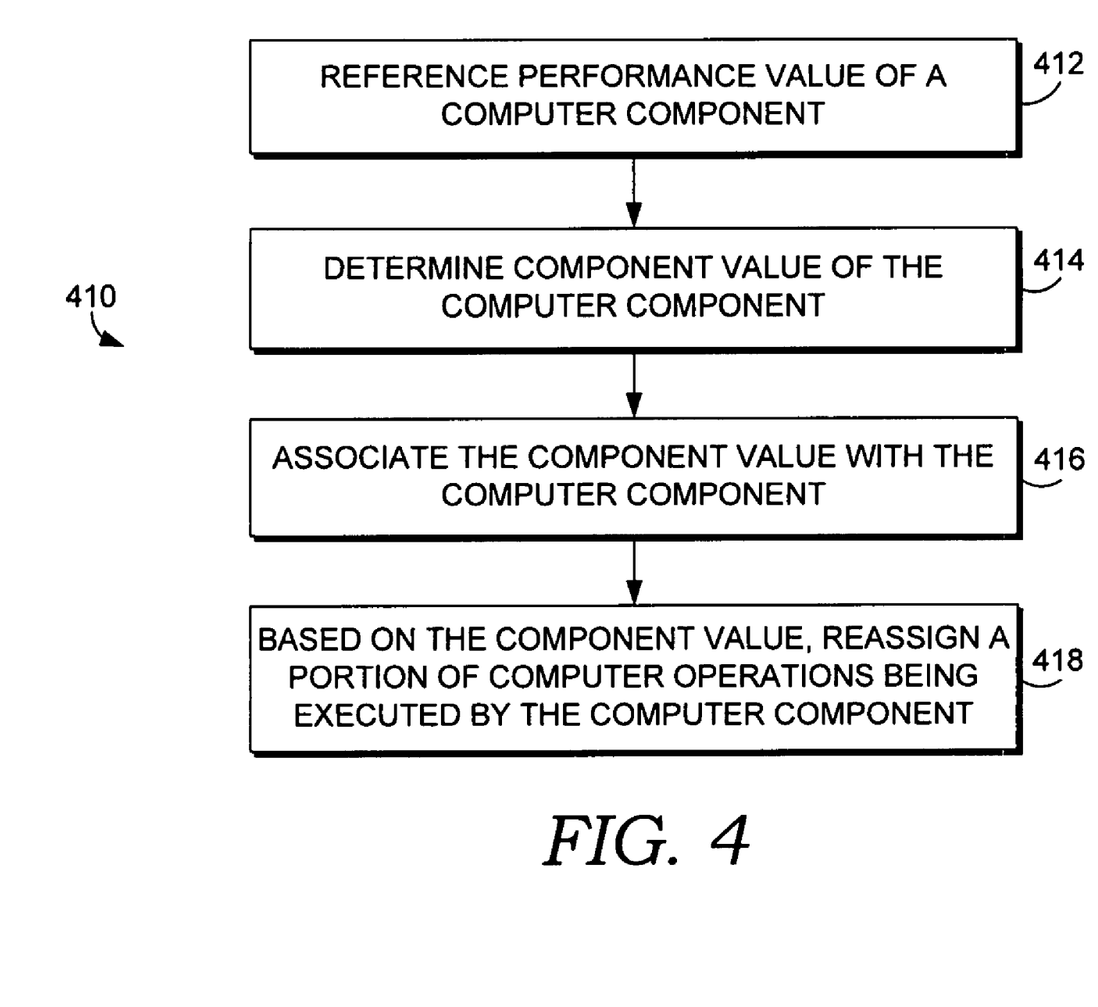
FIGS. 4-6 each depict a flow diagram showing an illustrative method of re-assigning computer operations, in accordance with various embodiments of the present invention.

Referring now to FIG. 4, one exemplary embodiment of the present invention includes computer-readable media having computer-executable instructions embodied thereon that, when executed, cause a computing device to perform a method (identified generally by reference numeral 410) of reassigning computer operations between a set of computer components. The method 410 includes, at step 412 referencing in a datastore a performance value of a first computer component, wherein the performance value indicates a usage of the first computer component toward executing the computer operations, and wherein an average performance value indicates an average usage of each computer component of the set of computer components. The method also includes, at step 414, utilizing the computing device to determine a component value of the first computer component, wherein the component value quantifies a contribution of the usage of the first computer component toward an imbalanced assignment of the computer operations between the set of computer components, and wherein the contribution value is based in-part on a ratio of the performance value divided by the average performance value. Moreover, step 416 includes associating in the datastore the component value with the first computer component, and at step 418, based on the component value, a portion of the computer operations being executed by the first computer component are re-assigned to one or more other computer components among the set of computer components.

Figure 5:
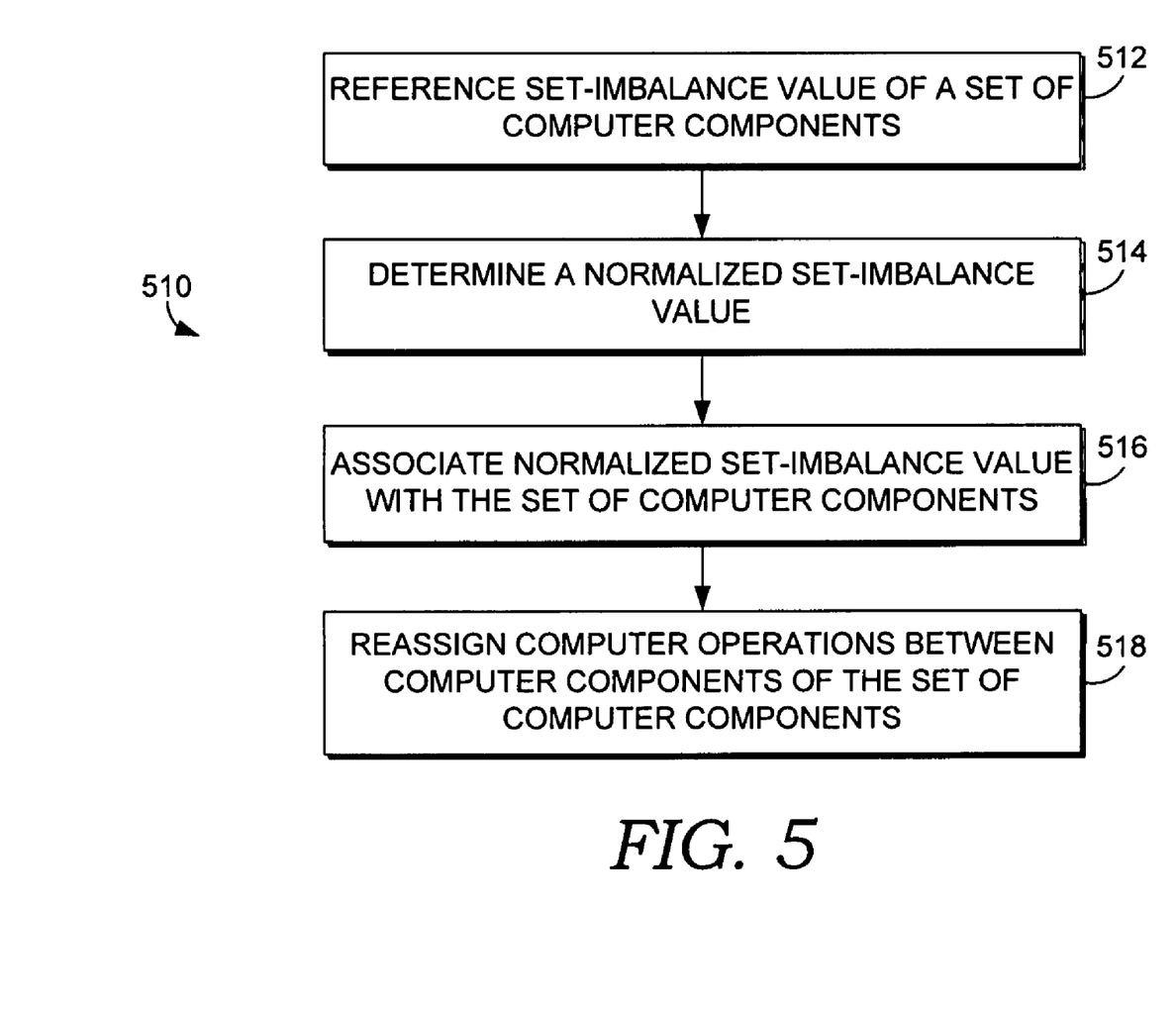

Referring now to FIG. 5, another exemplary embodiment of the present invention is directed to computer-readable media having computer-executable instructions embodied thereon that, when executed, cause a computing device to perform a method (identified generally by reference numeral 510) of reassigning computer operations between a set of computer components. The method 510 includes, at step 512, referencing in a datastore a set-imbalance value that quantifies an extent to which the computer operations are unevenly assigned between a number of computer components of the set of computer components. Moreover, the computing device is utilized at step 514 to determine a normalized set-imbalance value that is usable to compare an imbalance of the set of computer components to an imbalance of another set of computer components, wherein the other set of computer components includes a second number of computer components that is not equal to the first number, and wherein the normalized set-imbalance value is a ratio of the set-imbalance value divided by a logarithm of the first number of computer components. At step 516, the method also includes associating in the datastore the normalized set-imbalance value with the set of computer components and at step 518, reassigning computer operations between the number of computer components of the set of computer components.

Figure 6:
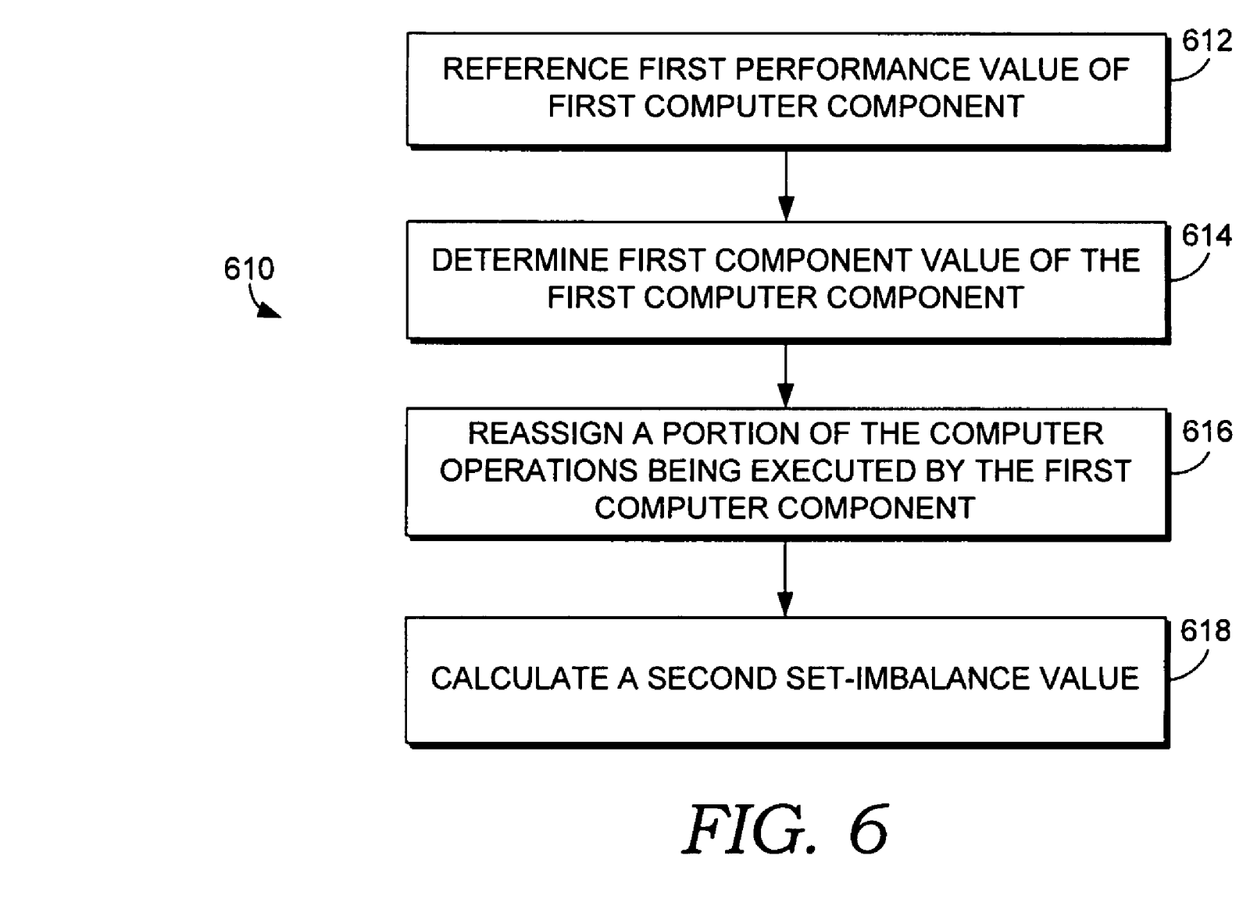

Referring now to FIG. 6, a further embodiment of the present invention includes computer-readable media having computer-executable instructions embodied thereon that, when executed, cause a computing device to perform a method (identified generally by reference numeral 610) of reassigning computer operations between a set of computer components. The method 610 includes, at step 612 referencing in a datastore a first performance value of a first computer component, wherein the first performance value indicates a usage of the first computer component toward executing the computer operations, and wherein a first average performance value indicates an average usage of each computer component of the set of computer components. Moreover, at step 614 the computing device is utilized to determine a first component value of the first computer component. The first component value quantifies a contribution of the usage of the first computer component toward an imbalanced assignment of the computer operations between the set of computer components. Moreover, the first component value is based in-part on a ratio of the first performance value divided by the first average performance value. The first component value is usable, together with other component values that describe each of the other computer components of the set of computer components, to determine a first set-imbalance value, which quantifies an extent to which the computer operations are unevenly assigned between each computer component of the set of computer components. Based on the first component value, at step 616 a portion of the computer operations being executed by the first computer component are reassigned to one or more of the other computer components, wherein reassigning the portion changes the usage of the first computer component toward executing the computer operations. Step 618 includes utilizing the computing device to calculate a second set-imbalance value, which is usable to determine whether the server operations are more evenly assigned after the portion was reassigned.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media storing computer-executable instructions thereon that, when executed, cause a computing device to perform a method of reassigning computer operations between a set of computer components, the method comprising:

referencing in a datastore a performance value of a first computer component that indicates a usage of the first computer component toward executing the computer operations, wherein an average performance value indicates an average usage of each computer component of the set of computer components;

utilizing the computing device to determine a component value of the first computer component by solving $(y_i/y_{avg})*\ln(y_i/y_{avg})$, wherein $y_i$ is the performance value of the first computer component and $y_{avg}$ is the average performance value of performance values among the set of computer components, wherein the component value of the first computer component is higher than an average component value among computer components included in the set of computer components; and wherein the component value quantifies a contribution of the usage of the first computer component toward an imbalanced assignment of the computer operations between the set of computer components and the average component value indicates an average contribution of the usage of each computer component toward the imbalanced assignment, and based on the component value being higher, reassigning a portion of the computer operations being executed by the first computer component to one or more other computer components among the set of computer components.

2. The computer-readable media of claim 1, wherein the set of computer components includes a set of server components.

3. The computer-readable media of claim 2, wherein the set of server components comprises one or more of a set of server disks, a set of processors, and a set of network cards.

4. The computer-readable media of claim 1, wherein the set of computer components includes one or more of a set of routers, a set of switches, and a set of network links.

5. The computer-readable media of claim 1, wherein the performance value includes one or more of a percentage of time during which the first computer component is in use, an operation time that indicates an average duration of time required by the first computer component to process an operation, an average queuing delay, a combination of the operation time and the average queuing delay, a number of input and output operations executed, a number of bytes transferred, a number of work threads used to process an operation, and a number of connections made for an operation.

6. The computer-readable media of claim 1, wherein the component value is higher than one or more other component values of the one or more other computer components.

7. Non-transitory computer-readable media storing computer-executable instructions thereon that, when executed, cause a computing device to perform a method of reassigning computer operations between a set of computer components, the method comprising:

receiving a respective performance value of each computing component that is included among the set of computer components, wherein each respective performance value indicates a respective usage of a respective computer component toward executing the computer operations and an average performance value indicates an average usage of each computer component of the set of computer components;

calculating a respective component value of each computing component by executing $(y_i/y_{avg})*\ln(y_i/y_{avg})$, wherein $y_i$ is the respective performance value and $y_{avg}$ is the average performance value among the set of computer components, and wherein each component value quantifies a contribution of a usage of the respective computer component toward an uneven assignment of the computer operations between the set of computer components;

calculating a set-imbalance value by determining an average component value of the respective component values, which apply to the set of computer components, wherein the set-imbalance value is based on an average of a plurality of component values, each of which describes one computer component of the set of computer components, such that the average component value indicates an average contribution of the usage of each computer component toward the imbalanced assignment; and reassigning a computer operation away from a first computing component having a component value greater than the set-imbalance value.

8. The computer-readable media of claim 7 further comprising, determining a normalized set-imbalance value by dividing the set-imbalance by a logarithm of a first number indicating a quantity of components in the set, wherein the normalized set imbalance value is usable to compare an imbalance of the set of computer components to an imbalance of another set of computer components, which includes a second number of computer components that is not equal to the first number.

9. The computer-readable media of claim 8, wherein comparing the imbalance of the set of computer components to the imbalance of another set of computer components comprises comparing the normalized set-imbalance value, which is associated with the set of computer components, to another normalized set-imbalance value, which is associated with the other set of computer components.

10. The computer-readable media of claim 8, wherein the normalized set-imbalance value of the set of computer components is greater than another normalized set-imbalance value, which is associated with the other set of computer components.

11. Non-transitory computer-readable media storing computer-executable instructions thereon that, when executed, cause a computing device to perform a method of reassigning computer operations between a set of computer components, the method comprising:

receiving a respective performance value of each computing component that is included among the set of computer components, wherein the set of computing components includes a first quantity of computing components and the respective performance value indicates usage of a respective computer component toward executing the computer operations;

calculating a respective component value of each computing component by executing $(y_i y_{avg})*\ln(y_i y_{avg})$, wherein $y_i$ is the respective performance value and $y_{avg}$ is an average a performance value among the set of computer components that indicates an average usage of each computer component of the set of computer components, and wherein each component value quantifies a contribution of a usage of the respective computer component toward an uneven assignment of the computer operations between the set of computer components;

calculating a set-imbalance value by determining an average component value of the respective component values, which apply to the set of computer components, wherein the set-imbalance value is based on a plurality of component values, each of which describes one computer component of the set of computer components, such that the average component value indicates an average contribution of the usage of each computer component toward the imbalanced assignment;

determining a normalized set-imbalance value by dividing the set-imbalance value by a logarithm of the first quantity, wherein the normalized set-imbalance value is comparable against another normalized set-imbalance value associated with another set of computer components, and wherein the other set of computer components includes a second quantity of computing components that is different than the first quantity; and reassigning computing operations between the set of computer components and the other set of computer components based on a comparison of the normalized set-imbalance value and the other normalized set-imbalance value, wherein the computing operations are assigned away from the set of computer components when the normalized set-imbalance value is greater than the other normalized set-imbalance value and are assigned away from the other set of computer components when the other normalized set imbalance value is greater than the normalized set imbalance value.

\* \* \* \* \*